(12) United States Patent
Seppälä et al.

(10) Patent No.: US 11,468,135 B2
(45) Date of Patent: Oct. 11, 2022

(54) USER'S SOCIAL MEDIA RATE OF ACTIVITY

(71) Applicant: HOOKLE INC., Helsinki (FI)

(72) Inventors: Tero Seppälä, Helsinki (FI); Jere Seppälä, Helsinki (FI); Juha Uotila, Helsinki (FI)

(73) Assignee: HOOKLE INC., Helsinki (FI)

( * ) Notice: Subject to any disclaimer, the term of this patent is extended or adjusted under 35 U.S.C. 154(b) by 198 days.

(21) Appl. No.: 16/767,231

(22) PCT Filed: Nov. 29, 2018

(86) PCT No.: PCT/FI2018/050863
§ 371 (c)(1),
(2) Date: May 27, 2020

(87) PCT Pub. No.: WO2019/106237
PCT Pub. Date: Jun. 6, 2019

(65) Prior Publication Data
US 2021/0004423 A1    Jan. 7, 2021

(30) Foreign Application Priority Data
Nov. 30, 2017 (FI) .................................... 20176081

(51) Int. Cl.
*G06F 16/00* (2019.01)
*G06F 16/9536* (2019.01)
*G06F 17/11* (2006.01)
*G06Q 50/00* (2012.01)

(52) U.S. Cl.
CPC .......... *G06F 16/9536* (2019.01); *G06F 17/11* (2013.01); *G06Q 50/01* (2013.01)

(58) Field of Classification Search
CPC ...... G06F 16/9536; G06F 17/11; G06Q 50/01
See application file for complete search history.

(56) References Cited

U.S. PATENT DOCUMENTS

| 9,612,996 | B1 | 4/2017 | Vanderwater et al. |
| 9,641,574 | B1 | 5/2017 | Lewis et al. |
| 2014/0074856 | A1 | 3/2014 | Rao |
| 2014/0366031 | A1 | 12/2014 | Jiang et al. |
| 2016/0321052 | A1* | 11/2016 | Sharifi ............... H04L 67/10 |
| 2017/0032248 | A1 | 2/2017 | Dotan-Cohen et al. |
| 2017/0103322 | A1 | 4/2017 | Baluja et al. |
| 2017/0140285 | A1 | 5/2017 | Dotan-Cohen et al. |
| 2017/0193585 | A1* | 7/2017 | Guo ............... G06F 16/9535 |

FOREIGN PATENT DOCUMENTS

EP   2 680 215   1/2014

OTHER PUBLICATIONS

Search Report for FI Application No. 20176081 dated Mar. 8, 2018, 2 pages.
International Search Report for PCT/FI2018/050863 dated Feb. 14, 2019, 3 pages.
Written Opinion of the ISA for PCT/FI2018/050863 dated Feb. 14, 2019, 7 pages.

* cited by examiner

*Primary Examiner* — Hung Q Pham
(74) *Attorney, Agent, or Firm* — Nixon & Vanderhye PC

(57) ABSTRACT

A rate service that combines reactions to individual user's social media inputs and the inputs is provided. The rate service determines user's rate of social media activity. The rate may be determined by weighting different dimensions of actions action-specifically.

19 Claims, 3 Drawing Sheets

USER'S SOCIAL MEDIA RATE OF ACTIVITY

This application is the U.S. national phase of International Application No. PCT/FI2018/050863 filed Nov. 29, 2018 which designated the U.S. and claims priority to FI Patent Application No. 20176081 filed Nov. 30, 2017, the entire contents of each of which are hereby incorporated by reference.

FIELD

The present invention relates to social media networking services.

BACKGROUND ART

Over the recent years, mobile communications devices have developed and new type of devices, such as smart phones, have become widely available and have substantially enriched the mobile user experience by offering new services and applications to users. Different social media services have become extremely popular amongst users, and most of users are using a plurality of social media services. An active user typically follows constantly how others have reacted to his/her posts, or other inputs. That requires that corresponding applications are on and running in the user's smart phone, for example. A problem with that is that each application consumes power while they are running at the background just to monitor reactions to the inputs.

SUMMARY

An object of the present invention is to provide a mechanism enabling feedback on reactions without a need of social media applications to run at the background. The object of the invention is achieved by a method, equipment and a computer program product which are characterized by what is stated in the independent claims. The preferred embodiments of the invention are disclosed in the dependent claims.

A general aspect of the invention provides a rate service that is one application combining reactions to individual user's social media inputs and the inputs. Hence, the information is received via one application, which in turn uses less processing capacity and thereby reduces power consumption. The rate service means herein a service that determines user's rate of activity (rate of social media activity), called herein "rate", in viewpoint of the user. In other words, it describes the user's rate of social media activity. The rate of activity may be determined by weighting different dimensions of actions action-specifically.

According to one aspect there is provided a method comprising: maintaining, by backend equipment, in at least one memory one or more rules comprising action-specific weights for two or more dimensions that are defined for social media networking services; maintaining, by the backend equipment, in the memory, subscriptions, each subscription defining at least user-specific social media accounts; performing, by the backend equipment, subscription-specifically at least the following: determining account-specifically for accounts in the subscription actions happened within a predetermined time limit in social media networking services; calculating, using the actions happened and at least one of the one or more rules, at least one of dimension-specific rate values, dimension-specific rate values social media-specifically, action-specific rate values, composite social media-specific rate values and a composite rate value; and causing sending at least one rate value to a user terminal associated with the subscription.

According to another aspect there is provided a computer program product readable by a computer and, when executed by the computer, configured to cause the computer to execute a computer process comprising: maintaining, by backend equipment, in at least one memory one or more rules comprising action-specific weights for two or more dimensions that are defined for social media networking services; maintaining, by the backend equipment, in the memory, subscriptions, each subscription defining at least user-specific social media accounts; performing, by the backend equipment, subscription-specifically at least the following: determining account-specifically for accounts in the subscription actions happened within a predetermined time limit in social media networking services; calculating, using the actions happened and at least one of the one or more rules, at least one of dimension-specific rate values, dimension-specific rate values social media-specifically, action-specific rate values, composite social media-specific rate values and a composite rate value; and causing sending at least one rate value to a user terminal associated with the subscription.

BRIEF DESCRIPTION OF THE DRAWINGS

In the following, exemplary embodiments will be described in greater detail with reference to accompanying drawings, in which.

DETAILED DESCRIPTION OF SOME EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Different embodiments and examples are described below using single units and computing devices and memory, without restricting the embodiments/examples to such a solution. Concepts called cloud computing and virtualization may be used as well. The virtualization may allow a single physical computing device to host one or more instances of virtual machines that appear and operate as independent computing devices, so that a single physical computing device can create, maintain, delete, or otherwise manage virtual machines in a dynamic manner. It is also possible that device operations will be distributed among a plurality of servers, nodes, devices or hosts. In cloud computing network devices, computing devices and/or storage devices provide shared resources. Some other technology advancements may cause one or more of the functionalities described below to be migrated to any corresponding abstraction or apparatus or device. Therefore, all words and expressions should be interpreted broadly, and they are intended to illustrate, not to restrict, the embodiment.

Figure 1:
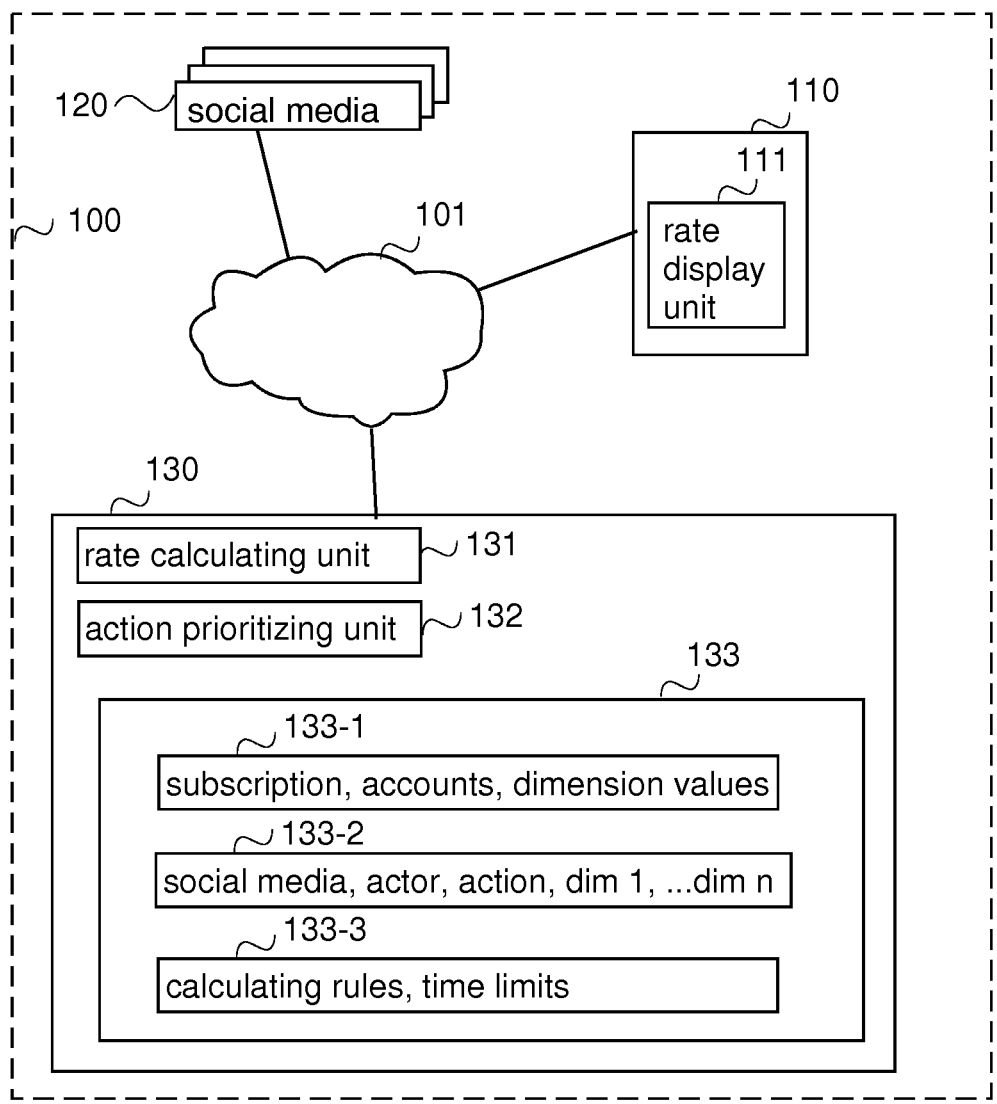
FIG. 1 shows simplified architecture of a system and block diagrams of exemplified equipments.

A general exemplary architecture of a system is illustrated in FIG. 1. FIG. 1 is a simplified system architecture only showing some devices, apparatuses and functional entities, all being logical units whose implementation and/or number may differ from what is shown. The connections shown in FIG. 1 are logical connections; the actual physical connections may be different. It is apparent to a person skilled in the art that the systems also comprise other equipment (apparatuses, devices, nodes), functions and structures used in or for social media services, data collection (measurements) on social media and communication. They, as well as protocols used, are well known by persons skilled in the art and are irrelevant to the actual invention. Therefore, they need not to be discussed in more detail here.

In the example illustrated in FIG. 1, the system 100 comprises a plurality of user terminals 110 (only one shown in FIG. 1), connectable over one or more networks 101 to different social media networking services 120 and to backend equipment 130 providing the rate service.

A network 101 may be any wired or wireless network enabling information exchange between different apparatuses/devices over the network.

The user terminal 110 refers to a portable computing device (equipment, apparatus), and it may also be referred to as a user device, a user apparatus or a mobile terminal. Such computing devices (apparatuses) include wireless mobile communication devices operating with or without a subscriber identification module (SIM) in hardware or in software, including, but not limited to, the following types of devices: mobile phone, smart-phone, personal digital assistant (PDA), handset, laptop, tablet and/or touch screen computer. The user terminal comprises for the rate service a rate display unit 111 whose functionality will be described in more detail below.

A wide range of social media networking services 120 exists. Typical examples of social media networking services are Internet-based micro-blogging services, like Twitter, Facebook and LinkedIn, just to name few without restricting solutions described herein to the examples mentioned. In a technical point of view, a social media networking service is a digital platform via which individuals can create and share user-generated content. The basic principle is that a user joins a social media service by opening an account, and after that can publish data and may subscribe to, comment and/or forward data published by other users. The way how a social media network is implemented bears no significance to the rate service itself, and therefore there is no need to described the social media networking services in more detail herein.

The backend equipment 130 may be a computing device, or a server, comprising memory, or a sub-system comprising computing devices that are configured to appear as one logical backend server (equipment) providing the rate service. A cloud computing based solution may be used in some examples as the backend equipment 130. The backend equipment 130 comprises in the illustrated example for the rate service a rate calculating unit 131, an action prioritizing unit 132 and a data storage 133. Examples of functionalities of the units will be described in more detail below. Further, although illustrated as separate units, the units may be integrated together, or split to sub-units.

The data storage 133, i.e. one or more memories, may be any kind of conventional or future data repository, including distributed and centralized storing of data, managed by any suitable management system forming part of the computing environment. The actual implementation of the data storage 133, the manner how data is stored, retrieved and updated, are irrelevant to the rate service itself and therefore are not described in more detail herein. However, the data storage 133 comprises for the rate service at least information 133-1 on subscriptions, information 133-2 on different social media networking services, and other information 133-3 for the rate service.

The subscriptions 133-1, i.e. the information on subscriptions, comprises subscriber-specific information on social media accounts of the subscriber, which the subscriber has inputted as his/her accounts, one or more network addresses whereto send rates. Further, calculated values for different dimensions defined for the social media networking services may be part of subscriber-specific information. Naturally also other information could be stored as part of subscriber information.

The information 133-2 on different social media networking services may comprise social media networking service-specifically definitions, such as actions, actors, and weights for different dimensions. A simplified example to illustrate what the information 133-2 on different networking services may comprise is given below in table 1, using two social media networking services, denoted by some, with a limited number of actions and with four dimensions without limiting the solutions to the example. It should be appreciated that there are no limitations to the amount of social media networking services, their actions, and for dimensions. Further, although in the example the weights are given as specific values, weights, or some of them, may be given as an equation, as well. It is also to be noticed that although social media services are mentioned, in some other examples also other services that are related to the same subscribes could be used.

TABLE 1

| Network | Actor | Action | Visibility | Reach | Engagement | Sentiment |
|---|---|---|---|---|---|---|
| Facebook | Owner | Post | 0.6 | 0 | 0 | 0 |
| Facebook | Other | Follow | 0.2 | 0.4 | 0 | 0 |
| Facebook | Other | Like | 0.1 | 0 | 0.3 | 0.5 |
| Facebook | Other | Love | 0.1 | 0 | 0.4 | 0.6 |
| Facebook | Other | Haha | 0.1 | 0 | 0.4 | 0.4 |
| Facebook | Other | Angry | 0.1 | 0 | 0.2 | −0.1 |
| Twitter | Owner | Post | 0.5 | 0 | 0 | 0 |
| Twitter | Other | Follow | 0.2 | 0.3 | 0 | 0 |
| Twitter | Other | Retweet | 0.7 | 0.6 | 0.5 | 0.1 |

The other information 133-3 for the rate service may comprise different predetermined time limits and one or more calculating rules (algorithms). The predetermined time limits may define how old social media actions will be taken into account in calculations, and/or when to trigger a recalculation.

Examples of calculation rules include rules how to calculate values for different dimensions and/or a composite rate. At the simplest values for the rates of the different dimensions reflecting subscriber's (i.e. a user of the service) social activity in a social networking service may be obtained by merely incrementing dimension value by each tracked action. Using the weights in Table 1, if someone likes a user's Facebook post this increases Visibility by 0.1, Engagement by 0.3, and Sentiment by 0.5. The same principle may be used to calculate a composite dimension rate. For example, using the example in Table 1, a composite Visibility rate, or a total Visibility rate, may be defined to be 0.6*the number of Facebook Posts+0.2*the number of Facebook Followers+0.1*(the number of Facebook Likes+the number of Facebook Loves+the number of Facebook Hahas and the number of Facebook Angrys)+0.5*the number of Twitter posts+0.2*the number of Twitter Followers+0.7*the number of Twitter Retweets. Naturally, any other kind of calculation rules may be defined. For example scaling, such as logarithmic transformation, may be used. As an example, the total Visibility rate may be defined to be A*log(0.6*the number of Facebook Posts)+B*log(0.2*the number of Facebook Followers)+C*log(0.1*(the number of Facebook Likes+the number of Facebook Loves+the number of Facebook Hahas and the number of Facebook Angrys))+D*log (0.5*the number of Twitter posts)+E*log(0.2*the number of Twitter Followers)+F*log(0.7*the number of Twitter Retweets), where A, B, C, D, E, and F are logarithmic weights for corresponding actions and may have the same or different values. Further, same principles to calculate a dimension rate may be used for all dimensions, or there may be a different principle for each dimension, or at least to some or one of them.

Further examples of calculation rules include how to calculate a composite rate. The composite rate may be defined to be a sum of composite dimension rates. Other examples include the composite rate to be the average of the composite dimension rates, or their geometric mean.

Further, the rules may define how to prioritize different actions, as will be described in more detail below. The prioritizing rules may be common to all, partly common to all, containing also subscription specific rules that may be stored as part of the subscription information, or each subscription may have its own prioritizing rules.

In some examples, historic data could be gathered, by the backend equipment for example, and based on that historic data, the backend equipment could perform analysis and predict the most likely outcome of various actions. With such predictions, recommendations for actions that will most likely produce a desired outcome. As a cloud computing-based solution has more resources available than a mobile device for example, more effective analysis and predictions may be performed as more data can be processed in a shorter time. It may also be possible to apply machine learning and/or artificial intelligence-based solutions in the cloud computing-based solution which may further enhance the analysis and prediction thereby allowing more precise predictions and more effecting prioritization.

The subscription information and/or the other information may also include rules, or settings to rescale the composite rate and/or one or more of the composite dimension rates. An example of a scale is from 0 to 100.

Figure 2:
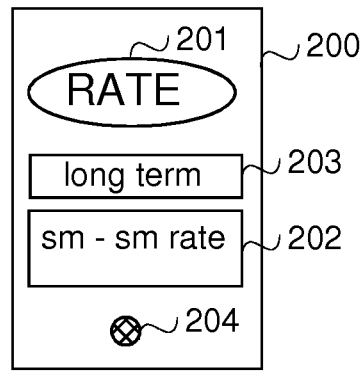
FIG. 2 shows one example what may be displayed on a user terminal.

FIG. 2 illustrates an example what the rate display unit, when running in a user terminal unit, may cause to be displayed on a user terminal display 200. In the illustrated example, a total rate 201, i.e. the composite rate, is displayed, as well as composite rates 202 for each social media service. The rate display unit receives the values from the backend over the one or more networks. Further, in the illustrated example, the rate display unit also displays two buttons, or any corresponding selectable icons, a button 203 for long term suggestions, and a button 204 for shorter term suggestions. In response to a user selecting one of the buttons, corresponding request is sent to the backend, a response comprising one or more suggestions on actions what the user should perform is received and the suggestion(s) is/are displayed to the user, possibly with a button triggering the action to be performed and/or with a button declining the action to be performed. Information on user's next input to the suggestion(s) may be sent to the backend system. As the information is received from the back-end, the resources required by the user terminal unit on which the rate display unit runs on may be minimized.

In other embodiments there may be more than two buttons for suggestions, only one button for suggestions, or no buttons for suggestions.

Furthermore, a button may be replaced by displaying directly a suggestion as a task, or challenge. For example, a challenge "Create 5 Facebook post" may be displayed as button 203, or instead of button 203 as mere information. In an implementation, clicking the displayed suggestion may cause a corresponding action to be triggered, for example opening the Facebook account for creating a post, and when the post is posted, the rate display unit may be configured to maintain track on what has happened and may be configured to cause updating the display to display "Create 4 Facebook post", and when 5 Facebook post are created, to determine (for example by requesting from the backend equipment without user input) a next task and to display it. In another implementation, a button not displaying tasks, for example button 204, may be clicked to cause the action corresponding to the task to be triggered, and the rate display unit may be configured to update the displayed task information correspondingly. In another alternative, the rate display unit may be configured to inform the backend system that the task is triggered, and the backend system may be configured to monitor the task, as part of corresponding subscription information, and send to the rate display unit a message causing update to what is displayed.

Figure 3:
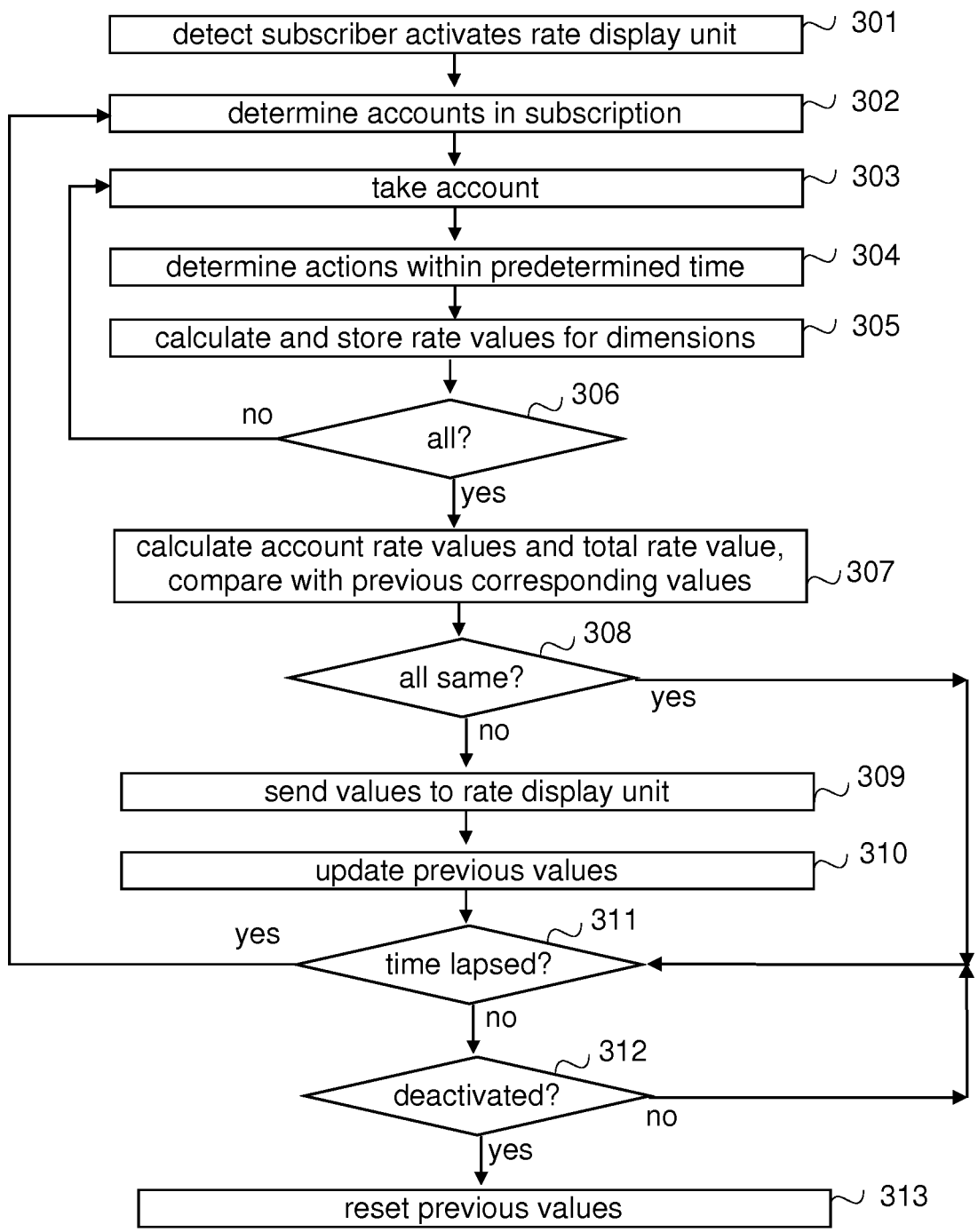
FIGS. 3 and 4 are flow charts illustrating exemplified functions.

FIG. 3 illustrates an example what the backend equipment, or more precisely the rate calculating unit, or a corresponding instance, performs. The functionality is described for one subscription but naturally a plurality of similar processes are running in parallel, for plurality of subscribers. In the example it is assumed that actions (inputs) in the social media service platforms are not copied to the backend equipment, and that the backend equipment does not perform online monitoring of the accounts. The solution of FIG. 3 may be amended to be implemented with online monitoring of the accounts, or some of the accounts, and/or copying actions of the accounts, or some of the accounts, to the backend equipment.

Referring to FIG. 3, the process starts when it is detected in step 301 that a user activates the total rate display unit, i.e. activates a corresponding app in his/her user terminal.

The social media accounts stored in the user's subscription are determined in step 302.

Then an account is taken in step 303, and actions (events, activities) happened within a predetermined time in the account are determined in step 304 from a corresponding server storing the actions for the account.

Once the actions have been determined, rate values for dimensions are calculated in step 305 using the calculation rule(s) (equation, formula) determined for the account type for the dimensions. Further, the results are stored in step 305. Examples of the calculation rules are given above with FIG. 1.

Then it is checked in step 306, whether or not rate values for all the accounts in the subscription have been determined. If not (step 306: no), the process returns to step 303 to take a further account for which rate values are to be calculated.

If rate values for all the accounts in the subscription have been determined (step 306: yes), in the illustrated example composite rate values for different accounts and the total composite rate value, i.e. values displayed in the example of FIG. 2, are calculated in step 307, using corresponding calculation rules, and compared in step 307 with corresponding previous values. If the values are not the same (step 308: no), the values calculated in step 307, or at least those that are different from the previous values, are sent in step 309 to the rate display unit in the user terminal for it to display them to the user. Then the values are set in step 310 to be the previous rate values.

If the values calculated in step 307 and the previous rate values are the same (step 308: yes), the process proceeds directly to step 310. By not sending the same value already displayed, current consumption is minimized and network resources are not used in vain. In another implementation rate values are always sent to the rate display unit in the user terminal. In the implementation no steps 309, 311 and 314 are performed.

Then it is monitored whether or not a predetermined update time has lapsed (step 311) or whether or not an indication that the user has closed the rate display unit, i.e. the corresponding app in his/her user terminal, is received (step 312).

When the predetermined update time has lapsed (step 311: yes), the process returns to step 302 to determine the accounts. By doing so it is ensured that if the user has updated new accounts to his/her subscription they will be taken into account.

If the user has closed the rate display unit (step 313: yes), the previous rate value is reset in step 314, and then the process for this subscription ends. By resetting the previous rate value it is ensured that when the rate display unit is next time activated, a rate value is sent.

Figure 4:
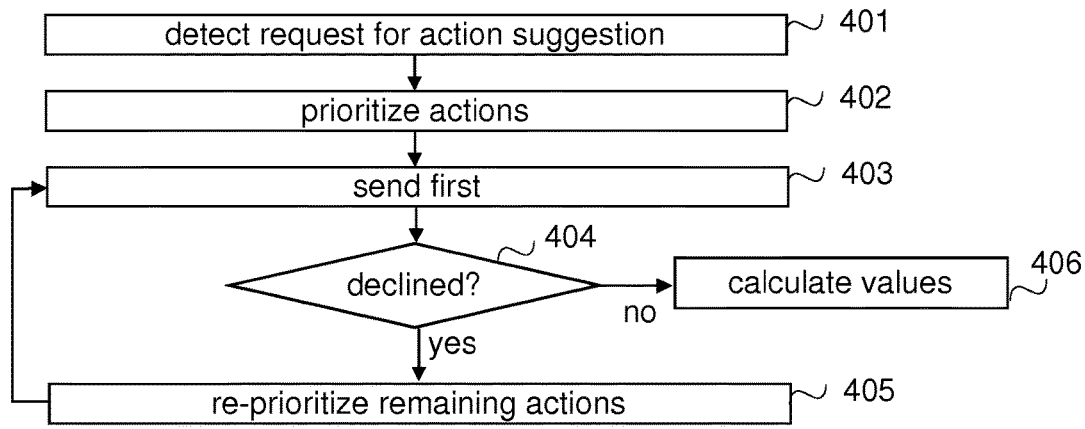

FIG. 4 illustrates an example what the backend equipment, or more precisely the action prioritizing unit, or a corresponding instance, performs. The functionality is described for one subscription but naturally a plurality of similar processes are running in parallel.

Referring to FIG. 4, when it is detected in step 401 that a request for suggestions of actions is received, prioritizing rules defined for the requested type of suggestions (long term, shorter term) are used to prioritize in step 402 the actions. The step may include determining passed actions on different accounts, calculating rate values, etc. For example, one may calculate consolidated rate values action-specifically, for example a rate value for adding a Facebook post, a rate value for adding a Twitter post, a rate value for a Twitter retweet, etc., and then ordering the rates from the biggest to the smallest, or from the one that will increase the total consolidated rate value at most. Other examples include calculating consolidated rate values for predefined action groups and/or for chained actions. Still a further example include calculating consolidated dimension-specific rate values action-specifically, combining that information with user preferences and then use the result for prioritizing. Further, weight values used for prioritizing may be different from or the same as weight values used for calculating rate(s) of activity. As can be seen, there is no restrictions how to perform the prioritizing.

Then, in the illustrated example, the one that is the first action according to the priority is sent in step 403 as a response, i.e. as a suggestion, and an indication of the user's input is received. If the indication indicates that user declines the suggested action (step 404: yes), the remaining suggested actions in the priority list are re-prioritized in step 405. At the simplest, the re-prioritizing may be that the declined action is removed from the prioritized set of actions. Then the process returns to step 403 to send the first action.

Figure 5:
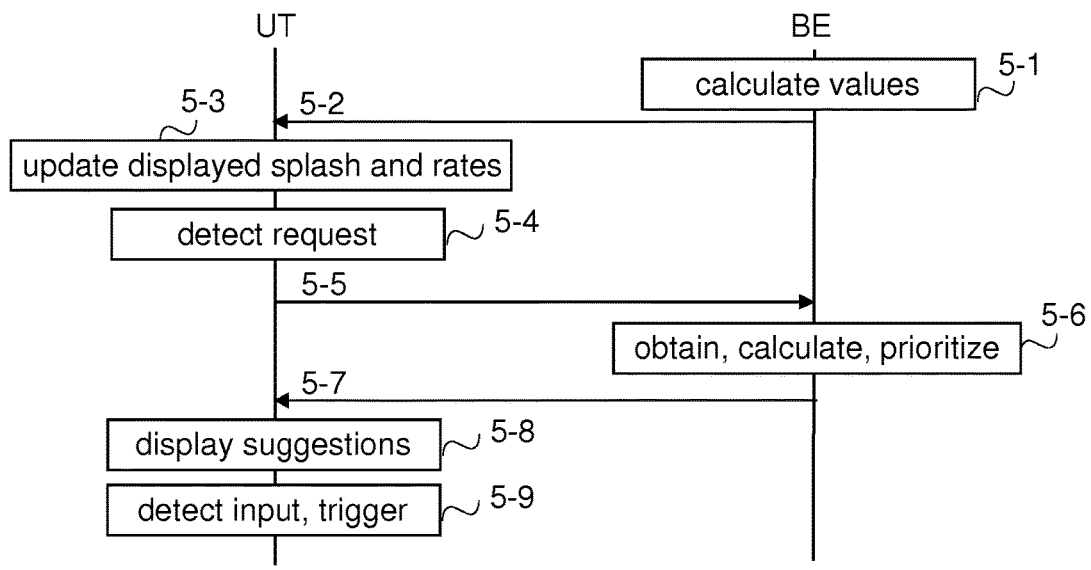
FIG. 5 illustrates information exchange.

FIG. 5 illustrates information exchange between a user terminal and the backend equipment according to another exemplified implementation. The social media service platforms are not included in FIG. 5 for the sake of clarity. Naturally, the user terminal exchange information with one or more social media service platforms and the backend equipment retrieves/obtains information from the social media service platforms.

Referring to FIG. 5, the backend equipment BE, or more precisely the rate calculating unit, repeats calculating one or more rate values (point 5-1), and sending calculation results in message 5-2, depending on the settings in the subscription of the user of the user terminal UT. For example, the settings may indicate that only the composite total rate value is to be submitted to the user terminal UT, and/or three (or any other number) biggest account-specific composition rate values with indication of the account. This may be performed without information whether the corresponding app, i.e. the rate display unit, is on.

When the rate display unit is on in the user terminal UT, the displayed information, such as a splash and/or one or more rates are updated in point 5-2 in response to a new message 5-2. For example, if dimension-specific values are sent, the display may comprise in addition to, or instead of, the total composite rate value also an illustration of values in different dimensions, the illustration forming a kind of a splash.

In the illustrated example, a user selects a suggestion button, and the user terminal UT, or more precisely the rate display unit, detects in point 5-4 a corresponding request for suggestions, and sends a request in message 5-5 to the backend equipment BE.

In response to message 5-5, the backend equipment BE, or more precisely the action prioritizing unit, obtains actions that happened during the time indicated in the request in different accounts in the subscription, calculates one or more required values and prioritizes the actions in point 5-6. Then, in the illustrated example the suggested actions are sent in their priority order in message 5-7 to the user terminal UT, which displays in point 5-8 the received suggestions in their priority order. In other words, a rank order of actions for this specific user is displayed.

Then, in the illustrated example, a user input selecting on of the actions in the rank order is detected in point 5-9, and a corresponding action, such as creating a post is triggered in point 5-9.

By triggering the corresponding action without need to go to open a corresponding social media application in the user terminal also uses less power, and it consumes less memory resources required for running the social media application. It may even be that the user decides not to download a social media application to a user terminal, and yet he/she may be able to perform actions by the user terminal to the social media platform, thanks to the rate display unit triggering the application.

Although in the above examples it is assumed that rates, suggestions and tasks are sent to one user terminal, it is obvious that the same information may be sent to two or more user terminals that are associated with the same subscription.

As is evident from the above examples, the disclosed solutions provides mechanism that collects a user's activity in different social network platforms into one platform, and uses the information to determine rate of activity by taking into account different dimensions of actions. A further effect, caused by the displayed information, is that the user's actions to be performed may be guided towards actions that best increases the user's rate of activity.

The steps/points and related functions and messages described above with FIGS. 2, 3, 4 and/or 5 are in no absolute chronological order, and some of the steps/points may be performed simultaneously or in an order differing from the given one. Other functions can also be executed between the steps/points or within the steps/points, and other information may be sent. Some of the steps/points or part of the steps/points can also be left out or replaced by a corresponding step/point or part of the step/point. Furthermore, a step/point and related function(s) described with a Figure may be combined to another Figure or replaced by a step/point and related function(s) described with another Figure.

The techniques and methods described herein may be implemented by various means so that equipment/a device/an apparatus configured to support rate service on at least partly on what is disclosed above with any of FIGS. 1 to 5, including implementing one or more functions/operations of a corresponding device described above with an embodiment/example, for example by means of any of FIGS. 1 to 5, comprises not only prior art means, but also means for implementing the one or more functions/operations of a corresponding functionality described with an embodiment/example, for example by means of any of FIGS. 1 to 5, and the equipment/device may comprise separate means for each separate function/operation, or means may be configured to perform two or more functions/operations. For example, one or more of the means and/or the rate display unit and/or the rate calculating unit and/or the action prioritizing unit described above may be implemented in hardware (one or more devices), firmware (one or more devices), software (one or more modules), or combinations thereof. For a hardware implementation, the device(s) or apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, logic gates, other electronic units designed to perform the functions described herein by means of FIGS. 1 to 5, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components described herein may be rearranged and/or complemented by additional components in order to facilitate the achievements of the various aspects, etc., described with regard thereto, and they are not limited to the precise configurations set forth in the given figures, as will be appreciated by one skilled in the art.

Figure 6:
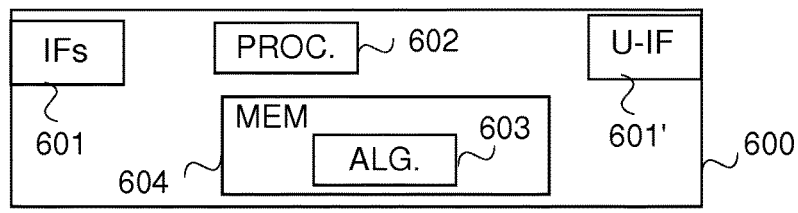
FIGS. 6 and 7 are schematic block diagrams.
Figure 7:
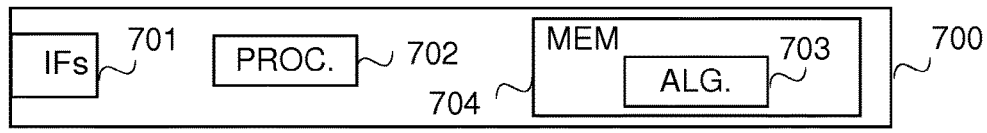

FIGS. 6 and 7 provide both an apparatus according to some embodiments of the invention. FIG. 6 illustrates an apparatus configured to carry out the functions described above in connection with the user terminal, and FIG. 7 illustrates an apparatus configured to carry out the functions described above in connection with the backend equipment. Each apparatus 600, 700 may comprise one or more communication control circuitry, such as at least one processor 602, 702, and at least one memory 604, 704, including one or more algorithms 603, 703, such as a computer program code (software) wherein the at least one memory and the computer program code (software) are configured, with the at least one processor, to cause the apparatus to carry out any one of the exemplified functionalities of the user terminal or the backend equipment. The apparatus may further comprise different communication interfaces 601, 701 and one or more user interfaces 601', separately illustrated for the user terminal only.

Referring to FIG. 6, at least one of the communication control circuitries in the apparatus 600 is configured to provide the rate display unit, or any corresponding sub-unit, and to carry out functionalities, described above by means of any of FIGS. 1 to 5, by one or more circuitries.

Referring to FIG. 7, at least one of the communication control circuitries in the apparatus 700 is configured to provide the rate calculating unit and/or the action prioritizing unit, or any corresponding sub-unit, and to carry out functionalities, described above by means of any of FIGS. 1 to 5, by one or more circuitries.

The memory 604, 704 or part of it may be implemented using any suitable data storage technology, such as semiconductor based memory devices, flash memory, magnetic memory devices and systems, optical memory devices and systems, fixed memory and removable memory.

The one or more communication interfaces 701 may comprise hardware and/or software for realizing communication connectivity according to one or more communication protocols. The communication interface may provide the apparatus with communication capabilities to communicate over a local connection and/or local connections and/or in a cellular communication system and/or in a fixed network, and enable communication between different apparatuses. The communication interface 701 may comprise standard well-known components.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a micro-processor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a user terminal or a similar integrated circuit in a device/apparatus.

In an embodiment, the at least one processor, the memory, and the computer program code form processing means or comprises one or more computer program code portions for carrying out one or more operations according to any one of the embodiments of FIGS. 1 to 5 or operations thereof.

Embodiments as described may also be carried out in the form of a computer process defined by a computer program or portions thereof. Embodiments of the methods described in connection with FIGS. 1 to 5 may be carried out by executing at least one portion of a computer program comprising corresponding instructions. The computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to examples according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A computerized method comprising:
   (a) maintaining, by backend equipment, in at least one memory one or more rules comprising action-specific weights for two or more dimensions that are defined for a plurality of different social media networking services;
   (b) maintaining, by the backend equipment, in the memory, a plurality of subscriptions, each subscription of the plurality of subscriptions having a user-specific social media account associated with a social media network service of the plurality of different social media networking services, wherein different accounts are associated with different social media networking services of the plurality of different social media networking services; and
   (c) for each corresponding user-specific social media account in each corresponding subscription:
   determining actions that occurred within a predetermined time limit in the social media networking service associated herewith;
   calculating, using the determined actions and corresponding action-specific weights in at least one of the one or more rules, at least one rate value, wherein the at least one rate value comprises at least one of dimension-specific rate values, action-specific rate values, social media specific dimension-specific rate values, and composite social media-specific rate values;
   prioritizing the determined actions based on at least one of the dimension-specific rate values, the action-specific rate values, the social media specific dimension-specific rate values, and the composite social media specific rate values;
   (d) causing a total composite be sent to, and displayed as an illustration of values in different dimensions of the two or more dimensions via, an application running on a user terminal associated with a respective subscription, wherein the total composite rate value is based on the at least one rate value;
   (e) an indication of at least one of the prioritized actions to be sent to the user terminal as a suggestion; and
   (f) responsive to a request corresponding to a selection of one of at least one of the prioritized actions being received from the user terminal, triggering a suggested action in at least one of the plurality of different social media networking services for displaying on the user terminal.

2. A computerized method as claimed in claim 1, further comprising repeating (c) at defined time intervals.

3. A computerized method as claimed in claim 1, further comprising:
   re-prioritizing the determined actions, by the backend equipment, in response to receipt of information indicating that a first prioritized action has been declined; and
   following the re-prioritizing, causing an indication of at least one of the re-prioritized actions to be sent to the user terminal as a new suggestion.

4. A computerized method as claimed in claim 1, wherein the prioritizing is performed using prioritization rules that are at least partly common to all of the subscriptions of the plurality of subscriptions.

5. A computerized method as claimed in claim 1, wherein the suggestion has a timeframe, the timeframe being one of first and second timeframes, the first timeframe being shorter than the second timeframe.

6. A computerized method comprising:
   running in a user terminal an application for providing rate values relating to a plurality of different social media network services;
   generating, by the application, output for display on the user terminal in response to the user terminal receiving, from backend equipment at least one rate value, wherein the at least one rate value comprises at least one of one or more dimension-specific rate values, one or more social media specific dimension-specific rate values, and one or more composite social media specific rate values;
   causing, by the application, a total composite rate value to be displayed on the user terminal as an illustration of values in different dimensions of the two or more dimensions, wherein the total composite rate value is based on the at least one rate value;
   in response to a user input to the user terminal selecting an icon for suggestions relating to actions performable in the plurality of different social media networking services, sending a request from the user terminal to the backend equipment;
   generating for display one or more suggestions received in response to the request, wherein the one or more suggestions are indicative of actions that are prioritized based on at least one of the dimension-specific rate values, the action-specific rate values, and the social media specific dimension-specific rate values; and responsive to user input selecting one of the one or more suggestions, triggering in at least one of the plurality of different social media networking services an action related to the selected one of the one or more suggestions.

7. A computerized method as claimed in claim 6, wherein the prioritizing is performed using prioritization rules that are at least partly common to all of the subscriptions of the plurality of subscriptions.

8. A computerized method as claimed in claim 6, wherein the suggestion has a timeframe, the timeframe being one of first and second timeframes, the first timeframe being shorter than the second timeframe.

9. A non-transitory computer program product, comprising program instructions which, when run on a computing apparatus, are configured to cause the computing apparatus to perform operations comprising:
(a) maintaining in at least one memory one or more rules comprising action-specific weights for two or more dimensions that are defined for a plurality of different social media networking services;
(b) maintaining in the memory, a plurality of subscriptions, each subscription of the plurality of subscriptions having a user-specific social media account associated with a social media network service of the plurality of different social media networking services, wherein different accounts are associated with different social media networking services of the plurality of different social media networking services; and
(c) for each corresponding user-specific social media caid account in each corresponding subscription:
determining actions that occurred within a predetermined time limit in the social media networking service associated therewith;
calculating, using the determined actions and corresponding action-specific weights in at least one of the one or more rules, at least one rate value, wherein the at least one rate value comprises at least one of dimension-specific rate values, action-specific rate values, social media specific dimension-specific rate values, and composite social media-specific rate values;
prioritizing the determined actions based on at least one of the dimension-specific rate values, the action-specific rate values, the social media specific dimension-specific rate values, and the composite social media specific rate values;
(d) causing a total composite rate value to be sent to, and displayed as an illustration of values in different dimensions of the two or more dimensions via, an application running on a user terminal associated with a respective subscription, wherein the total composite rate value is based on the at least one rate value;
(e) causing an indication of at least one of the prioritized actions to be sent to the user terminal as a suggestion; and
(f) responsive to a request corresponding to a selection of one of at least one of the prioritized actions being received from the user terminal, triggering a suggested action in at least one of the plurality of different social media networking services for displaying on the user terminal.

10. A computer program product as claimed in claim 9, wherein (c) is repeated at defined time intervals.

11. A computer program product as claimed in claim 9, wherein the instructions are runnable to perform operations further comprising:
re-prioritizing the determined actions, in response to receipt of information indicating that a first prioritized action has been declined; and
following the re-prioritizing, causing an indication of at least one of the re-prioritized actions to be sent to the user terminal as a new suggestion.

12. A computer program product as claimed in claim 9, wherein the prioritizing is performed using prioritization rules that are at least partly common to all of the subscriptions of the plurality of subscriptions.

13. A computer program product as claimed in claim 9, wherein the suggestion has a timeframe, the timeframe being one of first and second timeframes, the first timeframe being shorter than the second timeframe.

14. An apparatus comprising at least one processor and at least one memory including computer program code wherein the at least one memory and the computer program code are configured, with the at least one processor, to cause the apparatus to carry out at least:
(a) maintaining in the at least one memory one or more rules comprising action-specific weights for two or more dimensions that are defined for a plurality of different social media networking services;
(b) maintaining in the at least one memory, a plurality of subscriptions, each subscription of the plurality of subscriptions having a user-specific social media account associated with a social media network serviceof the plurality of different social media networking services, wherein different accounts are associated with different social media networking services of the plurality of different social media networking services; and
(c) for each corresponding user-specific social media account in each corresponding subscription:
determining actions that occurred within a predetermined time limit in the social media networking service associated herewith;
calculating, using the determined actions and corresponding action-specific weights in at least one of the one or more rules, at least one rate value, wherein the at least one rate value comprises at least one of dimension-specific rate values, action-specific rate values, social media specific dimension-specific rate values, and composite social media-specific rate values;
prioritizing the determined actions based on at least one of the dimension-specific rate values, the action-specific rate values, the social media specific dimension-specific rate values, and the composite social media specific rate values;
(d) causing a total composite rate value to be sent to, and displayed as an illustration of values in different dimensions of the two or more dimensions via, an application running on a user terminal associated with a respective subscription, wherein the total composite rate value is based on the at least one rate value;
(e) causing an indication of at least one of the prioritized actions to be sent to the user terminal as a suggestion; and
(f) responsive to a request corresponding to a selection of one of at least one of the prioritized actions being received from the user terminal, triggering a suggested action in at least one of the plurality of different social media networking services for displaying on the user terminal.

15. An apparatus as claimed in claim 14, wherein (c) is repeated at defined time intervals.

16. An apparatus as claimed in claim 14, wherein:
the determined actions are re-prioritized in response to receipt of information indicating that a first prioritized action has been declined; and
following the re-prioritizing, an indication of at least one of the re-prioritized actions is sent to the user terminal as a new suggestion.

17. An apparatus according to claim 14, wherein the apparatus is backend equipment separate from the user terminal.

18. An apparatus as claimed in claim 14, wherein the prioritizing is performed using prioritization rules that are at least partly common to all of the subscriptions of the plurality of subscriptions.

19. An apparatus as claimed in claim 14, wherein the suggestion has a timeframe, the timeframe being one of first and second timeframes, the first timeframe being shorter than the second timeframe.

* * * * *